US010002371B1

(12) United States Patent
Baker et al.

(10) Patent No.: US 10,002,371 B1
(45) Date of Patent: Jun. 19, 2018

(54) SYSTEM, METHOD, AND COMPUTER PROGRAM PRODUCT FOR SEARCHING SUMMARIES OF ONLINE REVIEWS OF PRODUCTS

(71) Applicant: CODEQ LLC, Apex, NC (US)

(72) Inventors: Douglas Dane Baker, Cary, NC (US); Brian Fernandes, San Diego, CA (US); Paulo Malvar Fernandez, La Mesa, CA (US); Muhammad Abdul-Mageed, Bloomington, IN (US)

(73) Assignee: Codeq, LLC, Charlotte, NC (US)

(*) Notice: Subject to any disclaimer, the term of this patent is extended or adjusted under 35 U.S.C. 154(b) by 0 days. days.

(21) Appl. No.: 14/339,213

(22) Filed: Jul. 23, 2014

Related U.S. Application Data

(63) Continuation-in-part of application No. 14/058,263, filed on Oct. 20, 2013, which is a continuation-in-part
(Continued)

(51) Int. Cl.
*G06F 7/00* (2006.01)
*G06F 17/30* (2006.01)
(Continued)

(52) U.S. Cl.
CPC ..... *G06Q 30/0281* (2013.01); *G06F 17/3053* (2013.01); *G06Q 30/0631* (2013.01); *Y10S 707/944* (2013.01)

(58) Field of Classification Search
CPC ............ G06F 17/3053; Y10S 707/944; G06Q 30/0631; G06Q 30/0281
(Continued)

(56) References Cited

U.S. PATENT DOCUMENTS 5,974,412 A * 10/1999 Hazlehurst et al. ... 707/999.003
6,523,026 B1 * 2/2003 Gillis ..................... 707/999.003
(Continued)

OTHER PUBLICATIONS

Blair-Goldensohn et al., "Building Sentiment Summarizer for Local Service Reviews", WWW 2008 Workshop: NPL in the Information Explosion Era. NLPIX2008, Beijing, China, Apr. 22, 2008.
(Continued)

*Primary Examiner* — Usmaan Saeed
*Assistant Examiner* — Brian E. Weinrich
(74) *Attorney, Agent, or Firm* — Bernard G. Pike; Pike IP Law, PLLC

(57) ABSTRACT

A system, method, and computer program product for researching online reviews to assess the performance and functionality of digital media consumer products bought online or not (e.g. eBooks, movies, TV shows, music, DVD's, etc.). The system extracts reviews from multiple online sources, including online "stores", professional articles, blogs, online magazines, websites, etc.; and, utilizes sentiment analysis algorithms and supervised machine learning analysis to present more informative summaries for each product's reviews, wherein each summary includes a sentence that encapsulates a sentiment held by many users; the most positive and negative comments; and a list of features with average scores (e.g. performance, price, etc.). Additionally, the user may view a separate review detail page per product that provides further summaries, such as a short list of other products that the same reviewer gave a very positive review for the features. The user is then able to purchase the product via a link.

5 Claims, 12 Drawing Sheets

Related U.S. Application Data of application No. 13/732,880, filed on Jan. 2, 2013, now Pat. No. 9,223,831.

(51) Int. Cl.
  *G06Q 30/00* (2012.01)
  *G06Q 30/02* (2012.01)
  *G06Q 30/06* (2012.01)
  *G06F 15/16* (2006.01)

(58) Field of Classification Search
  USPC .............................. 707/748, 944; 705/26.7
  See application file for complete search history.

(56) References Cited

U.S. PATENT DOCUMENTS

| | | | |
|---|---|---|---|
| 7,630,986 B1 * | 12/2009 | Herz et al. ............... | 707/999.01 |
| 8,230,016 B1 | 7/2012 | Pattan et al. | |
| 8,626,771 B2 * | 1/2014 | Fowler et al. ............. | 707/748 |
| 2008/0077471 A1 | 3/2008 | Musgrove | |
| 2009/0234712 A1 | 9/2009 | Kolawa | |
| 2010/0312769 A1 | 12/2010 | Bailey et al. | |
| 2011/0246181 A1 | 10/2011 | Liang et al. | |
| 2011/0282821 A1 | 11/2011 | Levy | |
| 2012/0072283 A1 | 3/2012 | DeVore et al. | |
| 2012/0072312 A1 | 3/2012 | Lange et al. | |
| 2012/0084292 A1 | 4/2012 | Liang et al. | |
| 2012/0116905 A1 | 5/2012 | Futty | |
| 2012/0185455 A1 | 7/2012 | Hedrevich | |
| 2012/0290910 A1 * | 11/2012 | Kumar et al. ............. | 707/748 |
| 2013/0066800 A1 | 3/2013 | Falcone et al. | |
| 2013/0066873 A1 | 3/2013 | Salvetti | |
| 2014/0156660 A1 | 6/2014 | Arbon et al. | |
| 2014/0164302 A1 | 6/2014 | Di Fabbrizio et al. | |
| 2014/0172412 A1 | 6/2014 | Viegas et al. | |

OTHER PUBLICATIONS

Screen Shot of an Amazon's company webpage image of summaries on posted books on Droplr website: http://i.elpt.ms/MPjp/511ofIGZ, (undated).

Abdul-Mageed, M. & Diab, M. (2014). SANA: A Large Scale, Multi-Genre, Multi-Dialect Lexicon for Arabic Sentiment Analysis. The 9th International Conference on Language Resources and Evaluation (LREC2014), May 26-31, Reykjavik, Iceland.

Abdul-Mageed, Muhammad, Mona T. Diab, and Mohammed Korayem. "Subjectivity and sentiment analysis of modern standard arabic." Proceedings of the 49th Annual Meeting of the Association for Computational Linguistics: Human Language Technologies: short papers—vol. 2. Association for Computational Linguistics, 2011.

Archak, N., Ghose, A., & Ipeirotis, P. G. (2007). Show me the money!: deriving the pricing power of product features by mining consumer reviews. Proceedings of the 13th ACM SIGKDD International Conference on Knowledge Discovery and Data Mining, 56-65.

Blair-Goldensohn, S., Hannan, K., McDonald, R., Neylon, T., Reis, G. A., & Reynar, J. (2008). Building a sentiment summarizer for local service revies. WWW Workshop on NLP in the Information Explosion Era.

Carenini, G., Ng, R., & Zwart, E. (2005). Extracting knowledge form ecaluative text. Proceedings of the 3rd International Conference on Knowledge Capture, 11-18.

Jindal, N. & Liu, B. (2006). Identifying comparative sentences in text documents. Proceedings of the 29th Annual International ACM SIGIR Conference on Research and Development in Infromation Retrieval, 244-251.

Joachims, T. (2002). Learning to classify text using support vector machines: Methods, theory, and algorithms. Computational Linguistics, 29(4), 656-664.

Hu, M., & Liu, B. (2004). Mining opinion features in customer revies. Proceedings of the National Conference on Artificial Intelligence, 755-760.

Hu, M., & Liu, B. (2004). Mining and summarizing customer reviews. Proceedings of the Tenth ACM SIGKDD International Conference on Knowledge Discovery and Data Mining, 168-177.

Kim, S., & Hovy, E. (2006). Automatic identification of pro and con reasons in online reviews. Proceedings of the COLING/ACL on Main Conference Poster Sessions, 483-490.

Lin, C., & Hovy, E. (1997). Identifying topics by position. Proceedings of the Fifth Conference on Applied Natural Language Processing, 283-290.

Liu, B., Hu, M., & Cheng, J. (2005). Opinion observer: Analyzing and comparing opinions on the web. Proceedings of the 14th International Conference on World Wide Web, 342-351.

Mandani, O., & Yu, J. (2010). Discovery of numerous specific topics via term co-occurrence analysis (pp. 1-33). Presented at the CIKM '10: Proceedings of the 19th ACM international conference on Information and knowledge management, ACM Request Permissions.

Mullen, T., & Malouf, R. (2006). A Preliminary Investigation into Sentiment Analysis of Informal Political Discourse. In AAAI Spring Symposium: Computational Approaches to Analyzing Weblogs (pp. 159-162).

Ng, V., Dagupta, S., & Arifin, S. M. (2006). Examining the role of linguistic knowledge sources in the automatic identification and classification of reviews. In Proceedings of the COLING/ACL on Main conference poster sessions (pp. 611-618). Association for Computational Linguistics.

Pang, B., & Lee, L. (Jul. 2004). A sentimental education: Sentiment analysis using subjectivity summarization based on minimum cuts. In Proceedings of the 42nd annual meeting on Association for Computational Linguistics (p. 271). Association for Computational Linguistics.

Pang, B., Lee, L., & Vaithyanathan, S. (Jul. 2002). Thumbs up?: sintiment classification using machine learning techniques. In Proceedings of the ACL-02 conference on Empirical methods in Natural Language processing—vol. 10 (pp. 79-86). Association for Computational Linguistics.

Sebastiani, F. (2002). Machine Learning in automated text categorization. ACM Computing surveys (CSUR), 34(1), 1-47.

Shi, B., & Chang, K. (2006). Mining chinese review. ICDM Workshops 2006. Sixth IEEE International Conference on Data Mining Workshops, 585-589.

Somprasertsri, G., & Lalitrojwong, P. (2008). Automatic product feature extraction from online product reviews using maximum entropy with lexical and syntactic features. Information Reuse and Intergration, 2008. IRI 2008. IEEE International Conference on, 250-255.

Somprasertsri, G., & Lalitrojwong, P. (2010). Extracting product features and opinions from product reviews using dependency analysis. Fuzzy Systems and Knowledge Discovery (FSKD), 2010 Seventh International Conference on, 5, 2358-2362.

Sun, A. (2012). Short text classification using very few words. Presented at the SIGIR '12: Proceedings of the 35th international ACM SIGIR conference on Research and development in information retrieval, ACM.

Wilson, T., Wiebe, J., & Hoffmann, P. (2009). Recognizing contextual polarity: An exploration of features for phrase-level sentiment analysis. Computational linguistics, 35(3), 399-433.

Wilson, T., Wiebe, J., & Hoffmann, P. (Oct. 2005). Recognizing contextual polarity in phrase-level sentiment analysis. In Proceedings of the conference on human language technology and empirical methods in natural language processing (pp. 347-354). Association for Computational Linguistics.

Phan, X. H., Nguyen, L. M., & Horiguchi, S. (2008). Learning to classify short and sparse text & web with hidden topics from large-scale data collections, 91-100.

Zhuang, L., Jing, F., & Zhu, X. (2006). Movie review mining and summarization. Proceedings of the 15th ACM International Conference on Information and Knowledge Management, 43-50.

(56) References Cited

OTHER PUBLICATIONS

Pang, B., & Lee, L. (2008). Opinion Mining and Sentiment Analysis (vol. 2, pp. 1-135). Foundations and Trends in Information Retrieval.

* cited by examiner

SYSTEM, METHOD, AND COMPUTER PROGRAM PRODUCT FOR SEARCHING SUMMARIES OF ONLINE REVIEWS OF PRODUCTS

PRIORITY CLAIM

The present application is a continuation-in-part of U.S. Utility patent application Ser. No. 14/058,263, filed Oct. 20, 2013, which is a continuation-in-part of U.S. Utility patent application Ser. No. 13/732,880 filed Jan. 2, 2013, the teachings of which are incorporated herein by reference in their entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to a web-based interface to assist users in selecting products based upon a computer implemented analysis of multiple reviews of the products.

BACKGROUND OF THE INVENTION

The online tools currently provided to display and view the millions of reviews of retail products, comprising consumer goods and services is limited. Generally a user can only retrieve a listing of user reviews and at best sort them by a rating that the user gives to a product in addition to the review text submitted. There has been very little done with regard to analyzing the review text directly for relevant details to provide to the end user evaluating a product's reviews to determine if s/he wants to purchase the product.

For example, United States Patent Application 20130066800 entitled "METHOD OF AGGREGATING CONSUMER REVIEWS" by Falcone et al, discloses a computer-based review website, system, and method that automatically aggregates relevant reviews onto an individual, first computer-based review website to enhance searches performed by consumers and enhance the SEO for companies that depend on such consumer searches. But, the system provides no analysis of the reviews to generate metrics as a means to objectively compare and contrast similar products. The system also relies only on consumer reviews and not industry expert reviews, which provide a more reliable evaluation of a product's advantages and disadvantages to the consumer.

Similarly, United States Patent Application 20120185455, entitled "SYSTEM AND METHOD OF PROVIDING SEARCH QUERY RESULTS", by Hedrevich discloses a system and method for searching and ranking information based on consumer product reviews with a search engine that allows the user to search a database by using terms that describe a product based on other users' comments. Search results may include the product review information, the product name, the product picture, the product price, and users reviewed excerpts. And while an algorithm is disclosed for computing the relevance ranking using Levenshtein distance, Okapi BM25 factor, and Phrase proximity ranking algorithms, no analysis is conducted to compare and contrast competitive products.

And while United States Patent Application 20130066873 A1, entitled "AUTOMATIC GENERATION OF DIGITAL COMPOSITE PRODUCT REVIEWS" discloses an automated computer system for computing the representativeness, coherence, liveliness, and informativity of a composite review. A composite review (compilation of multiple user reviews) is deemed "lively" the review contains at least one superlative word; the phrase contains at least one comparative word; the phrase contains at least one degree modifier word; etc.; and, likewise for computing the representativeness, coherence, and informativity. But again, the automated system does not compare and contrast via objective statistical analysis different products from the same class.

These inventions do not disclose comparing and contrasting different retail products using statistical analysis or other computing methods to highlight the most positive and most negative features of the product as determined by multiple reviewers, and to quantify the ratings of the particular features; as well as to provide separate displays of reviews by professional industry reviewers versus non-technical user reviewers.

Neither do these systems provide a cross-referencing feature to display another product: 1) that a reviewer rated as highly as the product that the user is investigating in order for them to comparison shop; nor 2) that a reviewer who gave a negative rating to the user's product of interest, alternatively rated other products as highly in order for the user to find a better product.

SUMMARY OF THE INVENTION

The present invention provides a system, method and computer program product (e.g. mobile App) and/or web-based service (e.g. webpage) to enable users to search for and select products comprising consumer goods and/or services sold online and via other venues, but for which reviews of the product are viewable on the Internet. In one embodiment, the products comprise digital media purchased for online streaming, downloading, accessing via the Internet, and/or physically shipping to the user, who is able to search for a particular product by name or product identification number, and/or search an entire class of products. The reviews are pulled from various online sources comprising: new stories, blogs, online magazines, retailer websites, and online reviews by professionals, etc. The system utilizes opinion/sentiment analysis algorithms and supervised machine learning to present more informative summaries for each product's reviews comprising data analysis and metrics of rated features of a product, such as the ease-of-use. The user may then click a link to purchase the product from the original source (e.g. online retailer). In an additional embodiment, the user may purchase the product from a webpage.

In a preferred embodiment, the user may view one or more of the following "Summaries" from the system analysis for a particular product the user is interested in purchasing:

1) A section containing one or more summary sentences from a reviewer that encapsulates a sentiment held by many reviewers, and displays that sentence in quotes and states, for example, "[x] of users out of [y] made a similar statement".

2) The most positive and/or negative reviews comprising a list of 2 or more pulled quotes culled from the reviews that the system CPU determines are the most positive and/or negative reviews.
3) A list of features extracted from the reviews with the average score as calculated by the system CPU next to them (e.g. Graphics 80%, Easy to Use 10%, Fun factor 40%).
4) A separate Review Detail Page for the product of interest (shown when the user clicks on a link within (1), (2), or (3) above), comprising a "Positive" or "Negative" score for each feature extracted. The Review Detail Page may also comprise an "Product Review Cross-Referencing Feature" providing a list of other products that a reviewer who: 1) gave a high rating to the user's searched product, also gave a high rating to the products on the list; and 2) gave a low rating to the user's searched product, but gave a high rating to similar products on the list.
5) A Professional Reviews Page comprising a listing of reviews extracted from online sources published by professionals who evaluate the performance of the product. Sources of the professional reviews may comprise, for example, professional blogs, online magazines, websites, etc.

The opinion/sentiment analysis algorithms and machine learning methods comprise primarily three main computer processes/subsystems/modules: 1) Review extraction and storage (aka "Review Scraper"); 2) Sentiment Analysis and Feature Extraction (SAFE); and 3) Query Interface Web Application. During Review extraction and storage, the system makes HTTP requests to a product information website (e.g. an online retailer, consumer reports, etc.) to retrieve all user submitted reviews for every type of product. These reviews are stored in a relational database after preprocessing, in a format that can be used as input to the Sentiment Analysis and Feature Extraction (SAFE) subsystem. The Review Scraper subsystem can also be configured to retrieve data from other online sources of reviews and/or information (e.g. product liability lawsuits). The Review Scraper subsystem will also periodically retrieve review data from the above mentioned data sources to keep the system's database of Review data up-to-date. The frequency of updating the review data is configurable, and may comprise, for example, daily to once per week system updating.

Sentiment Analysis and Feature Extraction (SAFE) retrieves the prepossessed reviews from the Review database and subsequently performs lexical analysis and supervised machine learning analysis to create summaries of the reviews comprising statistical analysis and metrics calculated by the CPU for various features of a particular product that the user is researching. As disclosed in a preferred embodiment supra, the Summaries may comprise, for example: a sentence that encapsulates a sentiment held by many users; the most positive and negative comments; and a list of extracted features with average scores (e.g. graphics, fun, easy to use, etc.). Additionally, the Summaries may comprise cross-referencing details to other products, such as a short list of other products (with its commercial name and icon) that: 1) a reviewer who gave a positive rating to the user's product of interest, also rated highly in order to comparison shop; and 2) a reviewer who gave a negative rating to the user's product of interest, alternative rated other products highly in order to find a better performing product. These SAFE derived Summaries are subsequently stored in the system's Review Analytics Database.

In one embodiment, the SAFE process comprises a Statement Matching algorithm that: 1) finds one or more Canonical Statements within a Product's review dataset that contain comments, observations, or sentiments statistically likely to be shared by multiple reviews in the dataset; and, 2) determines the subset of reviews that made statistically similar statements to these Canonical Statements.

The user then uses the Query Interface Web Application to search for the SAFE Summaries in the Review Analytics Database. This may comprise a computer program product of the present invention such as a mobile App, or a web-based service (e.g. website) to conduct the search and view the retrieved summaries. The user is also able to use the Query Interface Web Application to click on a link to purchase the product from its original source (e.g. online retailer).

BRIEF DESCRIPTION OF THE DRAWINGS

The above and other features, aspects, and advantages of the present invention will become better understood with regard to the following description, appended claims, and accompanying drawings where:

DETAILED DESCRIPTION

Glossary of Terms

Figure 1:
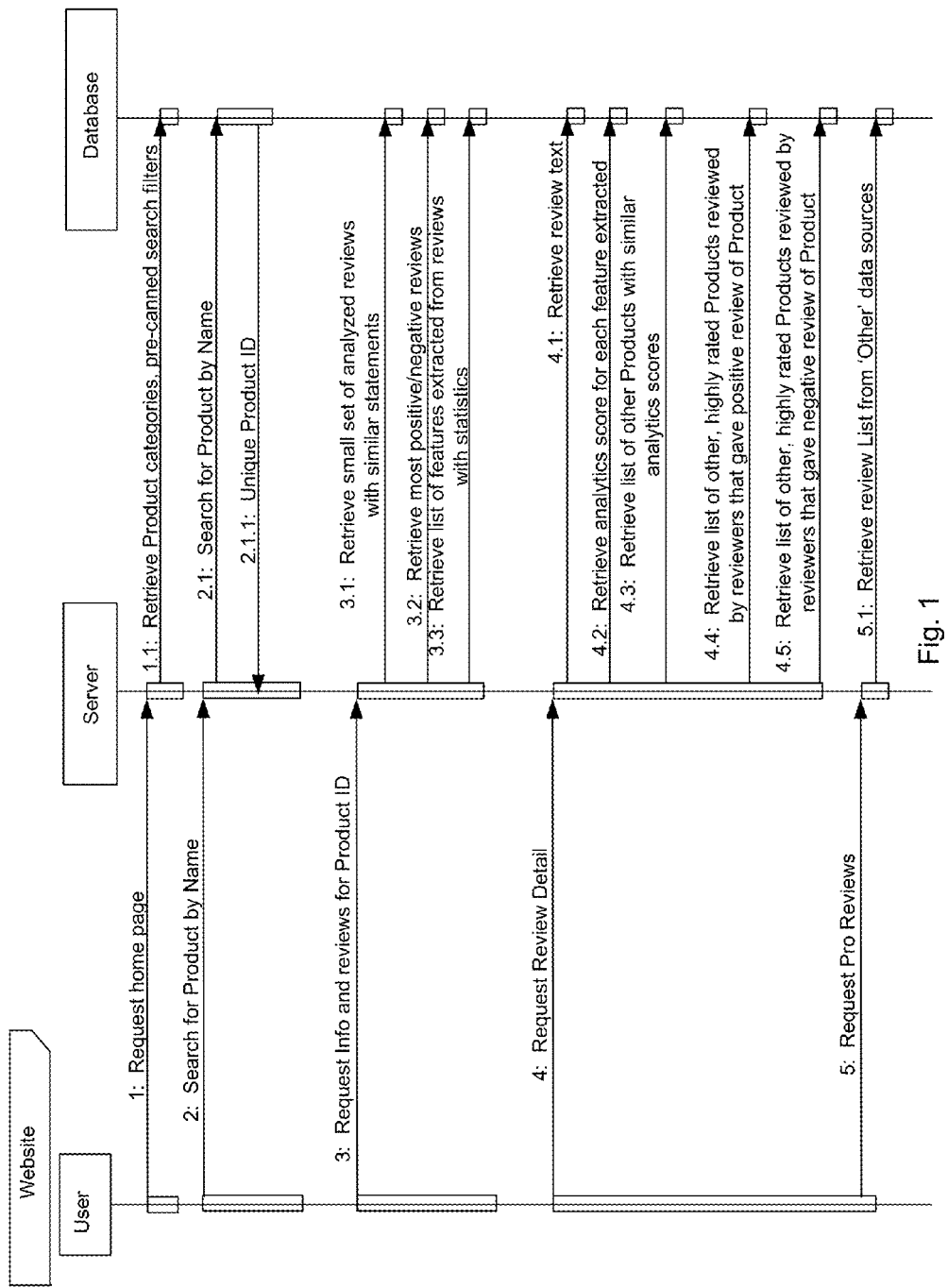
FIG. 1 is a Unified Modeling Language (UML) sequence diagram for the steps of the user inputting a search for a particular type of product, and the system server responding to the request with analyzed metrics for relevant products.

As used herein, the term "Product" refers to any service and/or consumer good for which reviews evaluating the product are available on the Internet. Products may comprise, for example, digital media purchased for online streaming, downloading, accessing via the Internet, and/or physically shipping to the user. Examples of digital media applicable to the present invention comprise: eBooks; paper books bought online and shipped; podcasts; digital movies, music, video games, audio books, TV shows, and desktop computer applications, that are streamed online or downloaded; and, DVD's copies purchased online and shipped to the user (e.g. DVD's).

As used herein, the term "User Client Computing Device" refers to any user electronic device comprising a central processing unit (i.e. processor) with the ability to transmit and receive electronic communications comprising via Internet and/or cellular connectivity, such as: laptops, desktops, tablets, iPads, iPods, smartphones, cell phones, and personal digital assistant devices. In a preferred embodiment, the user's device is an iOS Internet-enabled device to permit the user to purchase and download the product identified in the search of the system database. It is noted, though, that any Internet-enabled mobile or non-mobile device of any type of operating system may search for products on the system database via the website of the present invention.

As used herein, the term "A System" may be used to claim all aspects of the present invention wherein it refers to the entire configuration of hardware and software in all embodiments. In a preferred embodiment, the "system" comprises a user computing device with Internet connectivity (e.g. laptops, tablets, smartphones, etc.). In an alternative embodiment of the present invention, the system comprises a client-server architecture comprising a user computing device with Internet connectivity, such as laptops, tablets, and smartphones, to communicate with a system server via a network, wherein the software of the present invention is installed on the system server and electronically communicates with the user's device over the Internet. Furthermore, the user's computing device may have modules of the present invention installed to assist in the user.

As used herein the term "Server" computer refers to any computing device that collects and stores the products' records on a database and executes the software programs of the present invention to search the database for a product with user desired features. The server system also facilitates the collection and distribution of content (e.g. product reviews) to and from a multiplicity of computers and servers.

As used herein, the term "Software" refers to computer program instructions adapted for execution by a hardware element, such as a processor, wherein the instruction comprise commands that when executed cause the processor to perform a corresponding set of commands. The software may be written or coded using a programming language, and stored using any type of non-transitory computer-readable media or machine-readable media well known in the art. Examples of software in the present invention comprise any software components, programs, applications, computer programs, application programs, system programs, machine programs, and operating system software.

As used herein, the term "Module" or "Subsystem" refers to a portion of a computer program or software that carries out a specific function (e.g. Review Scraper module, SAFE module, etc.) and may be used alone or combined with other algorithms/modules of the same program. The programs may be stored on non-transitory computer-readable media to enable computers and/or computer systems to carry out part or all of the methods encoded therein.

As used herein, the term "App" or "app" refers to application software downloaded to a mobile device via the Internet. The computer software is designed to help the user perform specific tasks on or from their mobile device.

As used herein, the term "Network" refers to any public network such as the Internet or World Wide Web or any public or private network as may be developed in the future which provides a similar service as the present Internet.

As used herein, the term "Reviewer" refers to any entity (person, organization, etc.) that publishes a critique of a product, be they a consumer, industry analyst, etc.

As used herein, the term "User" refers to the entity who is utilizing the analytics and metrics computed by a system server via the Query Interface Web Application as viewed from their mobile app or a web browser (e.g. on their laptop) in order to research a product that they are interested in.

General User and Server Steps

As illustrated in FIG. 1, the user interacts with the system server via the Query Interface Web Application (FIG. 2B, 800) for the method of searching, selecting, and viewing the analytics summary of a particular product that they are interested in potentially purchasing. The user's steps are initiated (see FIG. 1, step 1) with the user navigating to a home page on the mobile app (computer program product) or the webpage of the present invention. The system server will subsequently retrieve product categories and pre-canned search filters (e.g. "What's Trending", "All-time Greats", "On Sale", etc.) to enable the user to search for a product by its commercial name or by a general category of intended use of the product or by a unique product identification (e.g. UPC) (FIG. 1, steps 1.1, 2, 2.1, 2.1.1). The user then requests information and reviews for the product of interest (FIG. 1, step 3), which the system server will retrieve from the Review Analytics Database (shown in FIGS. 2A & 2B, 250) comprising: i) a small set of analyzed reviews with similar statements (step 3.1); ii) the most positive/negative reviews (step 3.2); iii) a list of features extracted from reviews of statistics (step 3.3). The user may then request more details of a particular review (FIG. 1, step 4) and the system will retrieve: i) review text (step 4.1); ii) an analytics score for each feature extracted and computed by the CPU of the system server (step 4.2); and iii) a list of other products with similar analytics scores (step 4.3). The user can also exercise the "cross referencing" feature in step 4.4 of retrieving a list of other highly rated products reviewed by other user(s) ("reviewer(s)") who gave positive reviews to the product the user is interested in. And in step 4.5 the user can retrieve a list of other highly rated products reviewed by other user(s) who gave a negative review to the product the user is interested in. The user may also request Professional Reviews written by experts (FIG. 1, step 5), and the system will retrieve a review list from "Other" data sources (e.g. blogs, online consumer and technical articles, websites, etc.) (step 5.1).

System Architecture and Data Flow

Figure 2A:
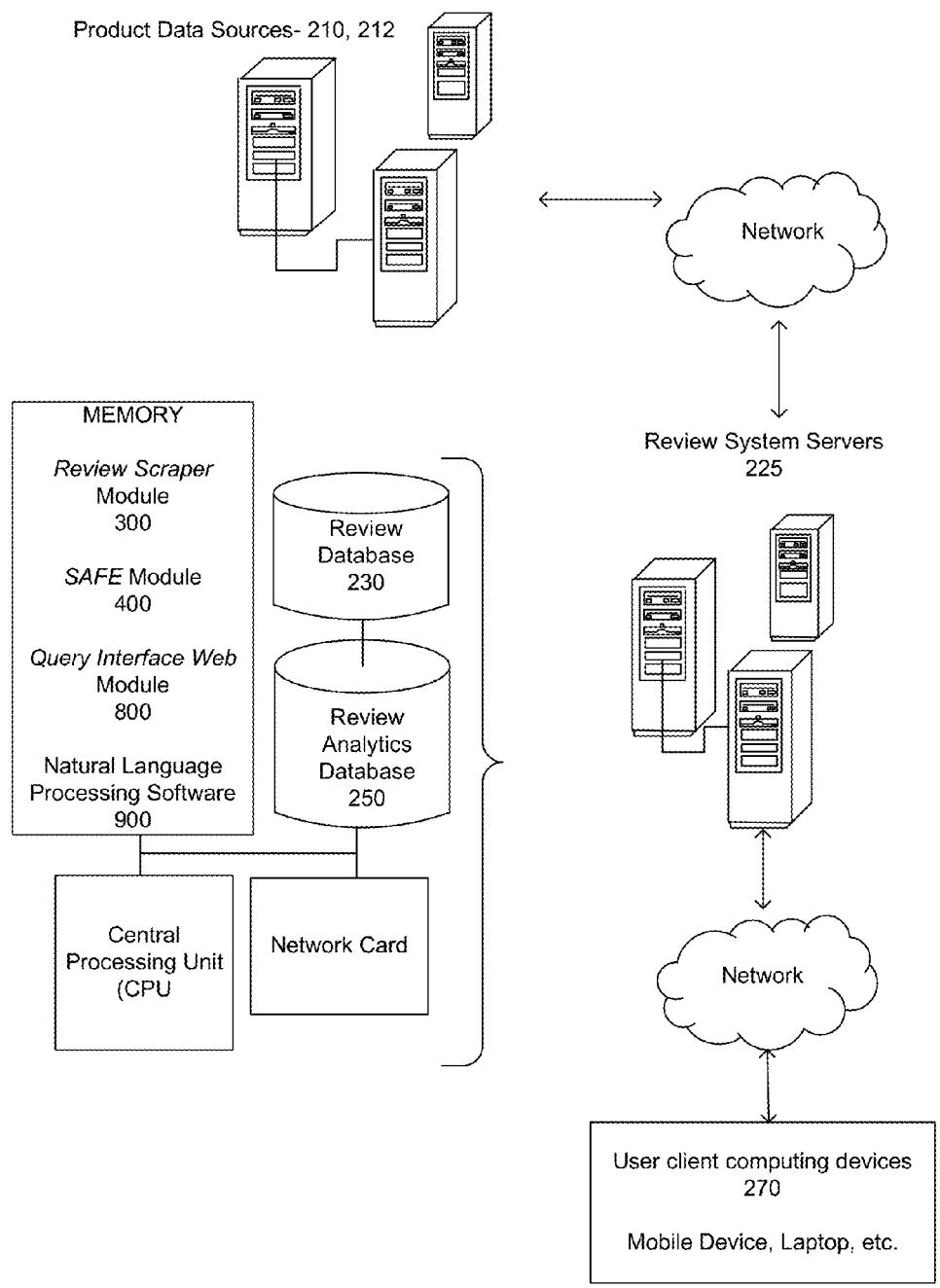
FIG. 2A is an illustration of the system architecture comprising a system server in communication with the product data sources and the client computing devices via the Internet.
Figure 2B:
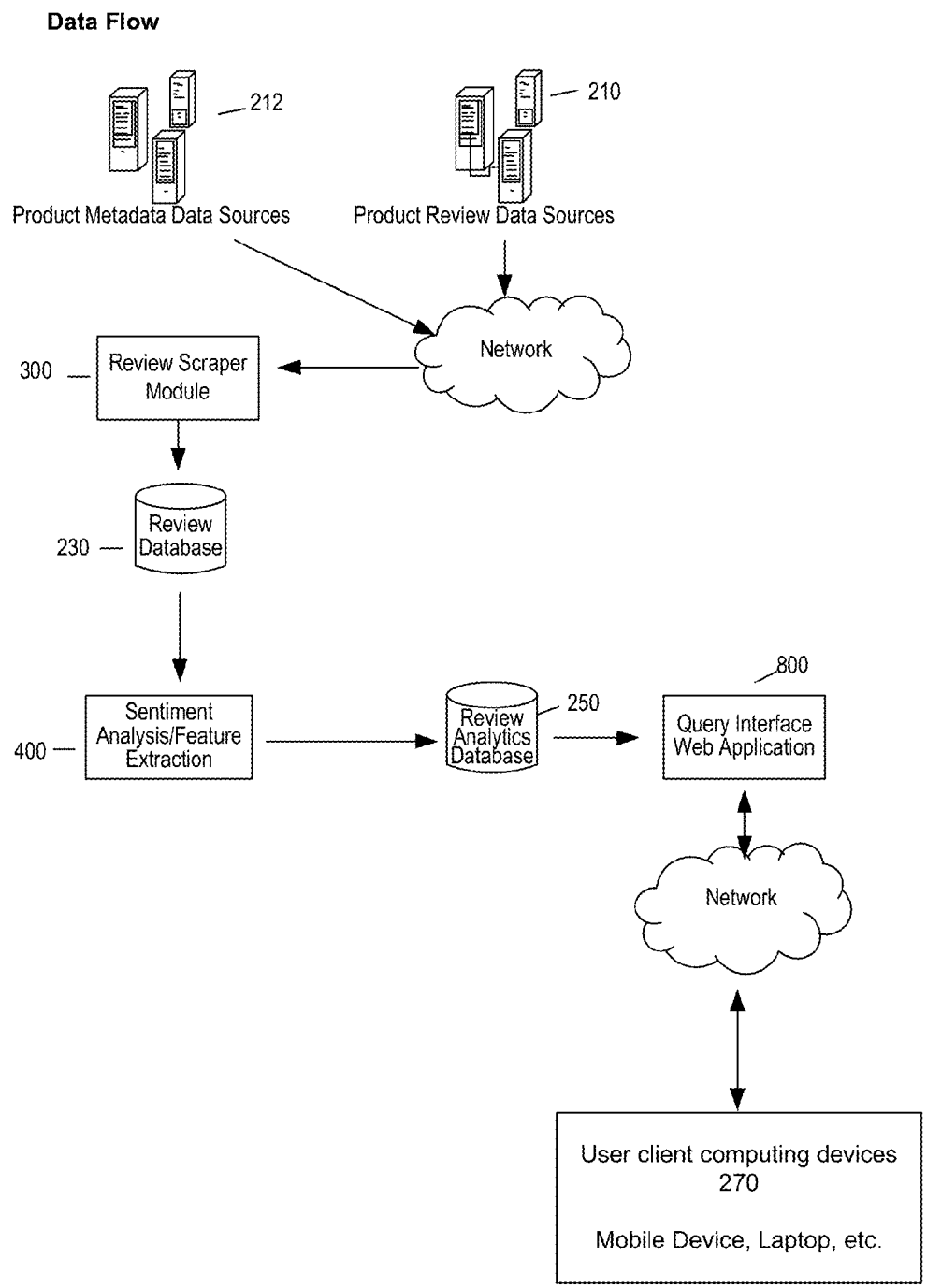
FIG. 2B is an illustration of data flow for one particular exemplification of FIG. 2A for pulling reviews from an product retailer's website, processing them by a system server, and then searching for and viewing analyzed summaries of the reviews on a user's electronic computing device.

FIG. 2A is a schematic diagram of the client-server system architecture of the present invention, and FIG. 2B is an illustration of the data flow from the exemplified online retailer, through processing on the system server, to searching and viewing by the user on a client computing device. The software and the computer program product of the present invention may comprise a cloud version and/or a hybrid version that uses cloud computing and conventional servers.

As illustrated in FIGS. 2A and 2B, the source of the product reviews comprise: 1) online product review data sources (210); and, 2) online product metadata data sources (212). Product review data sources (210) may comprise various online sources that provide reviews of products by consumers and industry professionals derived from, for example, blogs, online magazines, articles, consumer complaint websites, etc. . . . . . And online product metadata data sources (212) may comprise any source of information about one or more Products. This information would include common subject matter like Name, Description, Price, Category, and potentially more specific information depending on what kind of Product it is (e.g. version). Data from the product data resources 210 and 212 are downloaded via a network (e.g. Internet) to the Review system server 225, which comprises one or multiple high speed CPU's (Central Processing Unit(s), primary memory (i.e. RAM), secondary storage device(s) (i.e. hard disk drives), and a means to connect the server with the network (e.g. a network card). The primary memory of the server 225 as illustrated in FIG. 2A also comprises the Review Scraper Module 300, the Sentiment Analysis Feature Extraction (SAFE) Module 400, the Query Interface Web Application 800, and natural language processing software 900 (e.g. Freeling™—an open source natural language processing tool suite). The databases on the Review system server 225 comprise the Review Database 230 for storing the pre-processed reviews pulled from the primary data source (e.g. source 210 and 212), and the Review Analytics Database 250 for storing the SAFE processed users' reviews.

The module and application programs, operating system and the database management programs may all run on the same computing device as in a traditional "main frame" type of configuration or several, individual yet interconnected computing devices as in a traditional "multi-tier client-server" configuration, as is well known in the art. The server system is coupled to the remote network (such as the Internet). The server system executes a (or multiple depending on the server system configuration) server program(s). The server system and the client program have communications facilities to allow client computers to connect to and communicate with the server program(s) such that the server program(s) can communicate with and exchange information with a multiplicity of user's client programs.

The User's client computing device may connect to the network via a variety of methods such as a phone modem, wireless (cellular, satellite, microwave, infrared, radio, etc.) network, Local Area Network (LAN), Wide Area Network (WAN), or any such means as necessary to communicate to the system server connected directly or indirectly to the network (i.e. the Internet).

A user client computing device 270 comprises an electronic computing device with web browser capabilities, such as a mobile communications device, a desktop, a laptop, a netbook, and a mobile phone device (i.e. smartphone), etc. The user's client computing device is configured to communicate with the Review system server 225 via the Internet to enable users to access the Query Interface Web Application 800 to search for and view summaries and metrics of product reviews by multiple reviewers.

Computer Program Product

In an alternative embodiment, the users' client computing devices 270 may comprise a mobile electronic computing device (e.g. smartphone, tablet, etc.) with a computer program product of the present invention (e.g. "Query Interface Mobile App" module) installed within the device's memory so as to perform all or part of the functions of the present invention for researching the analytic summaries and metrics computed by the Review system server 225's CPU.

The computer program product (e.g. "Mobile App") of the present invention may comprise a native application, a web application, or a widget type application to carry out the methods of graphically displaying the content on a computing device screen. In a preferred embodiment, a native application is installed on the device, wherein it is either pre-installed on the device or it is downloaded from the Internet. It may be written in a language to run on a variety of different types of devices; or it may be written in a device-specific computer programming language for a specific type of device. In another embodiment, a web application resides on the Review system server 225 and is accessed via the network. It performs basically all the same tasks as a native application, usually by downloading part of the application to the device for local processing each time it is used. The web application software is written as Web pages in HTML and CSS or other language serving the same purpose, with the interactive parts in JavaScript or other language serving the same purpose. Or the application can comprise a widget as a packaged/downloadable/installable web application; making it more like a traditional application than a web application; but like a web application uses HTML/CSS/JavaScript and access to the Internet.

In a preferred embodiment, all user client computing devices 270, will access the Query Interface Web Application, wherein the web app will deliver HTML pages optimized for each type of client platform. For example, iOS users will see rendered html pages optimized for navigation by the mobile device, laptop/PC users will see rendered html pages optimized for standard navigation by these respective devices based on the type of browser being used (standard detection of Internet Explorer, Google Chrome, Firefox, etc.). Additionally for iOS devices, the user will retrieve a downloadable app via the Internet to their mobile device so that s/he can easily access the web app from an icon on their mobile device. This makes it easier than requiring the user to load the web browser and retrieve a bookmarked URL to the web app, but like a web application the downloadable app uses HTML/CSS/JavaScript and accesses the Internet. Likewise, laptop/PCs may access the web app via a standard browser.

The flow of data from the primary data sources of multiple reviews and review types (e.g. 210 and 212) to viewing by user on their user client computing device 270 is illustrated in FIGS. 2A and 2B and further disclosed infra.

Review Scraper Module

The "Review Scraper" (FIGS. 2A and 2B, 300) comprises a software module stored on the system server and executed by the system CPU for the purpose of retrieving product reviews from online data sources (e.g. online stores, blogs, online magazines and web sites, etc.). The Review Scraper module causes the system server to submit an HTTP request message to the server of the online product review data source 210 and/or the product metadata data sources 212 to pull all online reviews for all products, then process and store them in the Review Database 230 for use by the Sentiment Analysis and Feature Extraction (SAFE) module 400.

Figure 3A:
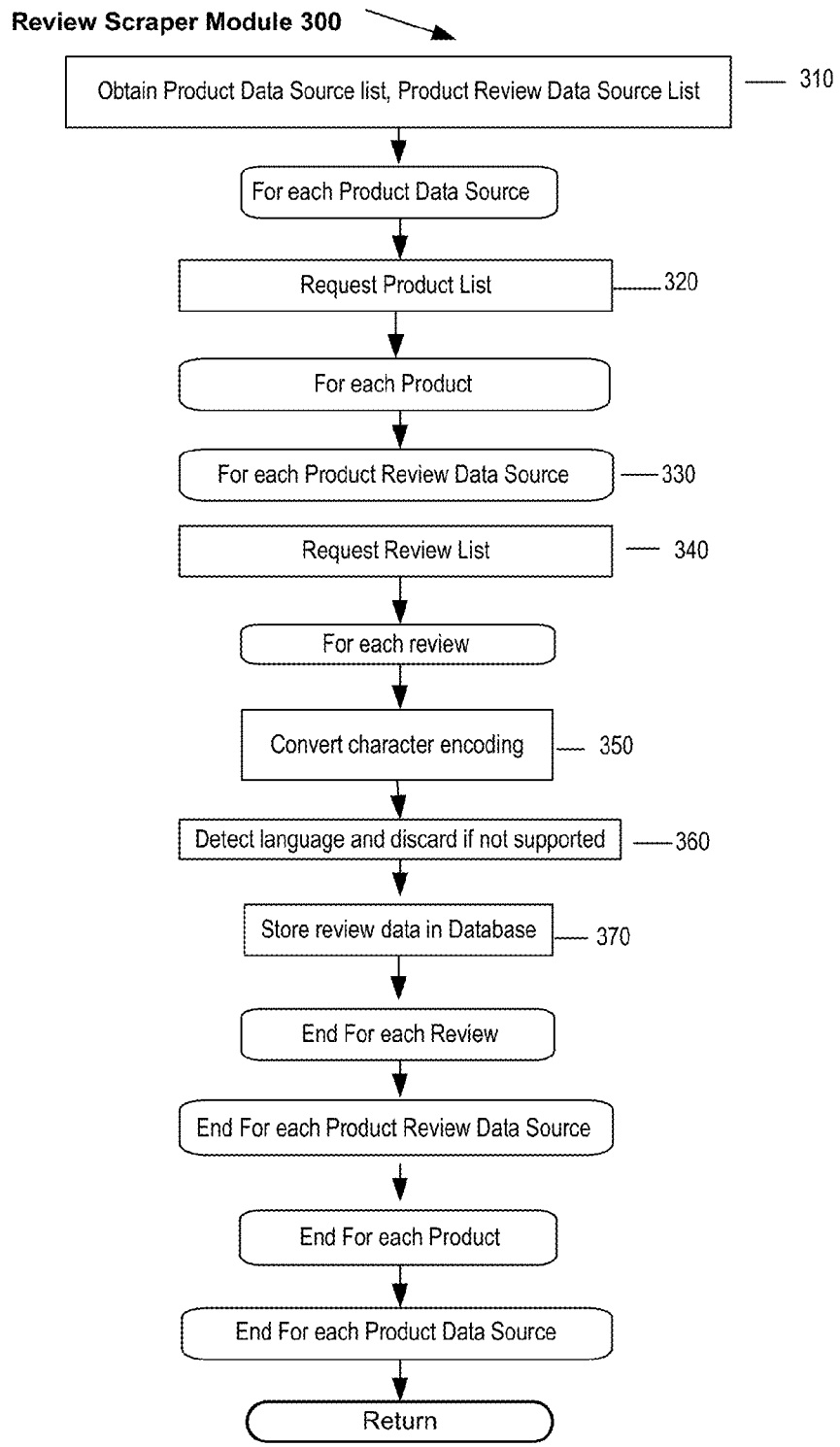
FIG. 3A is a flowchart of computer processor steps for the Review Scraper module.
Figure 3B:
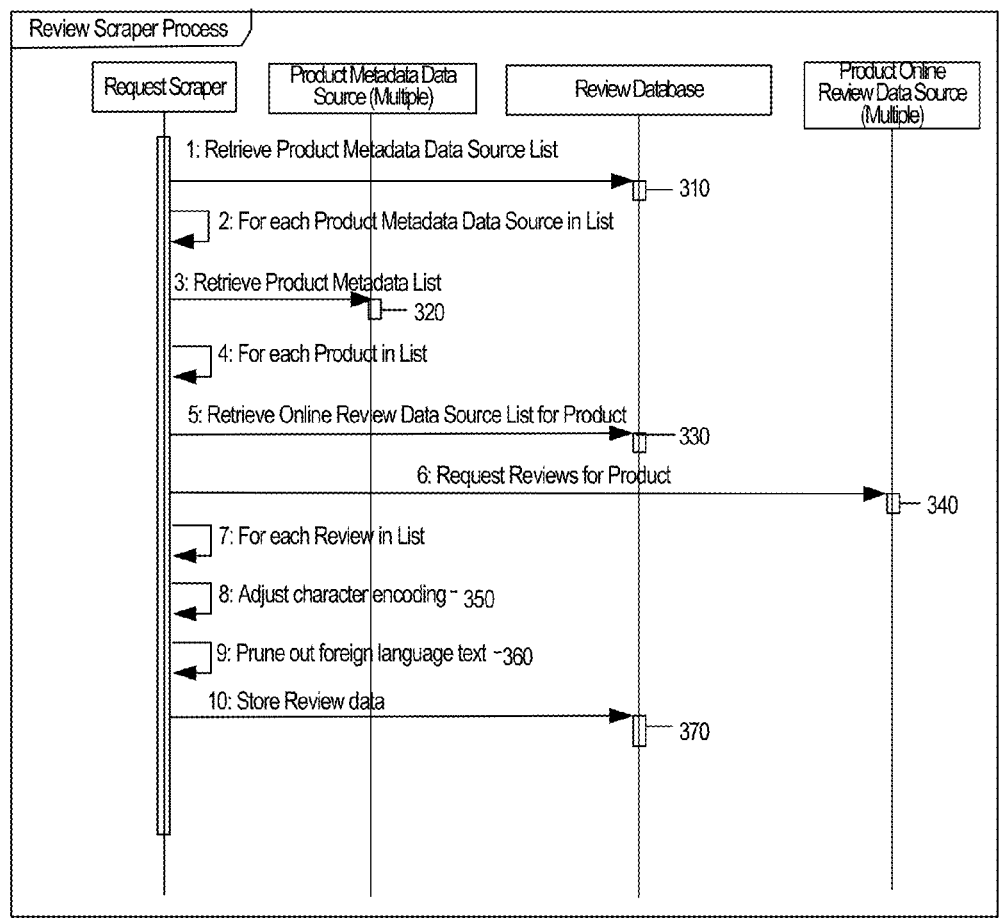
FIG. 3B is a Unified Modeling Language (UML) sequence diagram for the steps followed by the Review Scraper module.

As detailed for a preferred embodiment in the flowchart for FIG. 3A, and the corresponding UML sequence diagram for all types of product sources in FIG. 3B, the Review Scraper process starts with the Review system server 225 retrieving a Product Metadata Source List, e.g. from an online source (e.g. as illustrated in FIGS. 3A and 3B, step 310). For each Product Metadata Data Source, the Review system server 225 requests a product list (step 320). Then the system server retrieves the product review data source list for each product on the list, request and retrieve online a review data source list for product (step 330) and requests the reviews for each product (step 340).

For each review, the Review system server 225 converts character encoding (step 350), detects language and discards if it is not supported (step 360), and stores the processed review in the Review Database 230. The data set describes a store's product list. It is generally exported from the store's product database and "published" online or made available for download at regular intervals (e.g. daily). The data may also be available in two different formats—either as the files necessary to build a relational database or as stand-alone flat files that are country and media dependent. This list will be refreshed periodically as new products are submitted to the online store frequently and this list grows over time. As per step 350, for each review retrieved the CPU will adjust or convert the character encoding of all reviews from ISO/IEC 8859-1 to UTF-8 to ensure compatibility with the Freeling module used in analytics processing. The system server will then remove all foreign language and other text if it is not translatable by the Scraper (step 360). The "edited" review data is then stored in the Review database 230 (step 370), and the process is repeated for each review retrieved from the product list in step 320. The system will then repeat steps 350-370 for each review pulled from each Product Review Data Source.

The Review Scraper Module will likewise repeat the process for each product review data source (steps 330-370); and then for each product (steps 320-370); and then for each product data source (310-370).

Sentiment Analysis and Feature Extraction (SAFE) Module

Figure 4A:
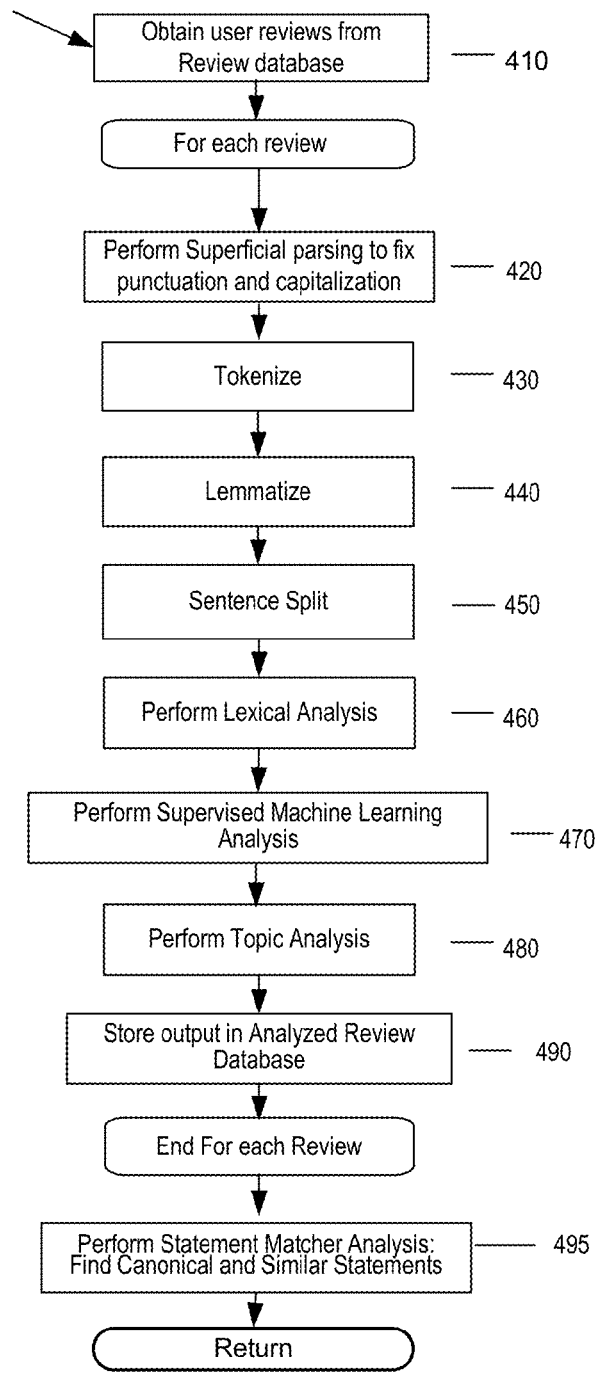
FIG. 4A is a flowchart of computer steps for the Sentiment Analysis Feature Extraction (SAFE) Module.
Figure 4B:
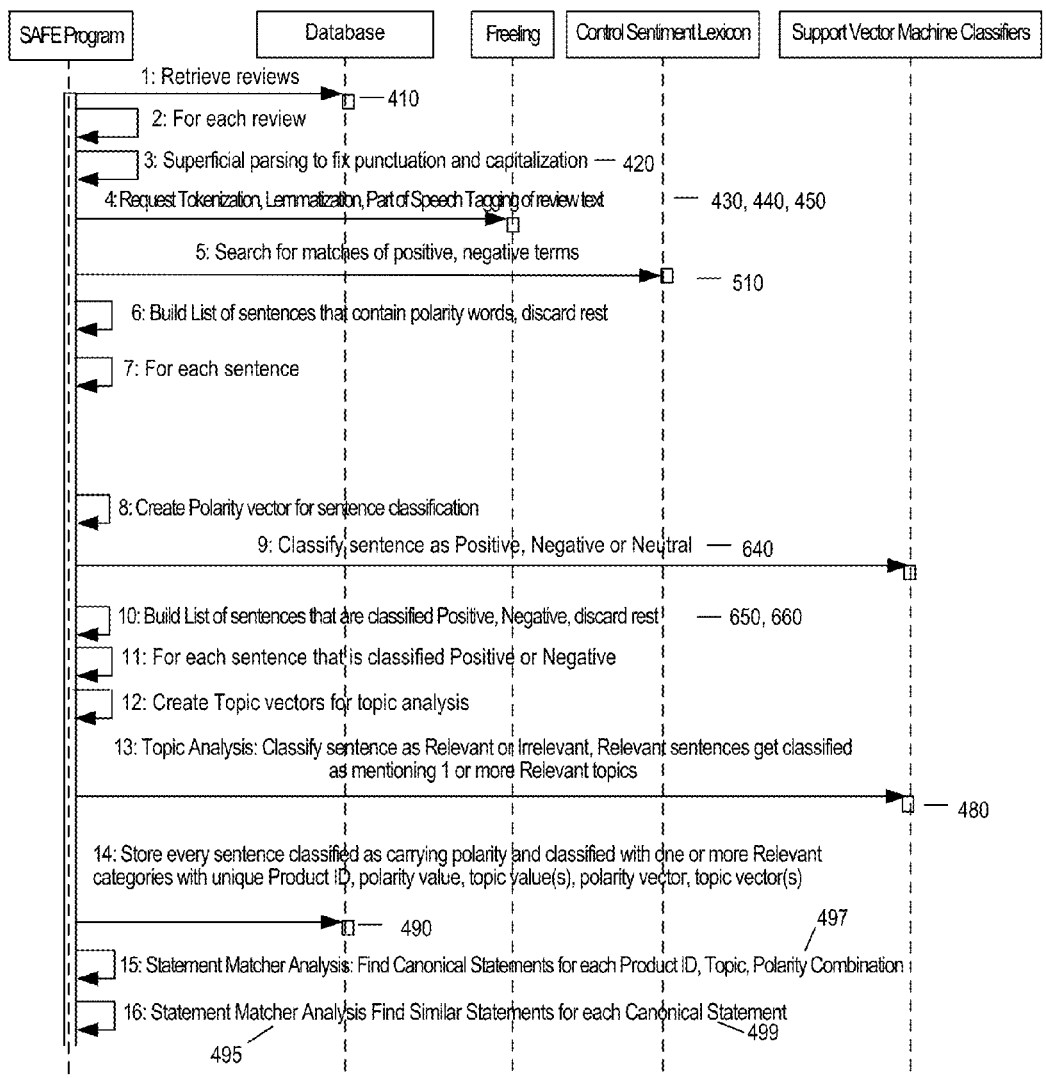
FIG. 4B is a Unified Modeling Language (UML) sequence diagram for the steps flowed by the Sentiment Analysis Feature Extraction (SAFE) Module.

The SAFE module analyzes the reviewers' evaluations stored in the Review database 230 via the flowchart steps shown in FIG. 4A, and the corresponding UML sequence diagram in FIG. 4B. As per step 410, the system server retrieves users' reviews stored in the Review database 230 for all products listed in the Product List. For each review pulled from the Review database 230, the SAFE module performs superficial parsing to fix punctuation and capitalization of the text within the review (step 420) to enable natural language processing software to recognize sentences. In a preferred embodiment, the Freeling natural language processing software is utilized, although it would be readily apparent to the skilled artisan how and which other types of language processing software to use with the present invention, such as LingPipe, CLAWS, Tnt, and MorphAdorner.

The CPU of the system server subsequently performs part-of-speech tagging on the review text processed in step 420 utilizing the language processing software. The process comprises marking up a word in a text of the review as corresponding to a particular part of speech (e.g. noun, verb, adjective, etc.) based upon its common known definition, as well as its context within the review, such as its relationship with adjacent and related words in a phrase, sentence, or paragraph within the review. In order to accomplish this, the natural language processing software performs tokenization (step 430) and lemmatization (step 440). During tokenization, the stream of text within the review is broken up into words, phrases, symbols and other elements known as "tokens". During lemmatization, the CPU determines the "lemma" of the words within the review, which is the canonical, dictionary, or citation form of a set of words (e.g. "run" is the lemma for runs, ran, running) The CPU performs an additional step, sentence splitting (step 450), during which the tokenized text is assembled with the help of the POS-tags assigned to it into sentences for use in step 460—Lexical Analysis.

By way of exemplification for steps 430-450: Freeling is loaded into the system server memory by executing it in the server mode: (analyze-f/usr/local/share/freeling/config/en-.cfg--nonec--nonumb--noner--noloc--noquant--nodate-flush--server--port 50005 &). Then every review that is output by the preprocessing step described in step 420 is sent to the Freeling process running in server mode in order to POS-tag it. Freeling output is parsed and structured as follows: 1) one list of lists with the tokenized words of every sentence in the review; 2) one list of lists with the tokenized lemmas of every sentence in the review; and 3) one list of lists with the tokenized POS-tags of every sentence in the review.

After processing the reviews by the natural language software 900, sentiment analysis is performed on the output (steps 460-470 in FIG. 4A). Topic analysis (step 480) is then performed. Following this, the output of the Topic Analysis is stored in step 490 in the Review Analytics Database 250 and comprises the classification of every sentence as carrying a polarity. Every sentence is also classified into one or more Relevant categories with unique Product ID, polarity value, topic value(s), polarity vector, and topic vectors.

Figure 5:
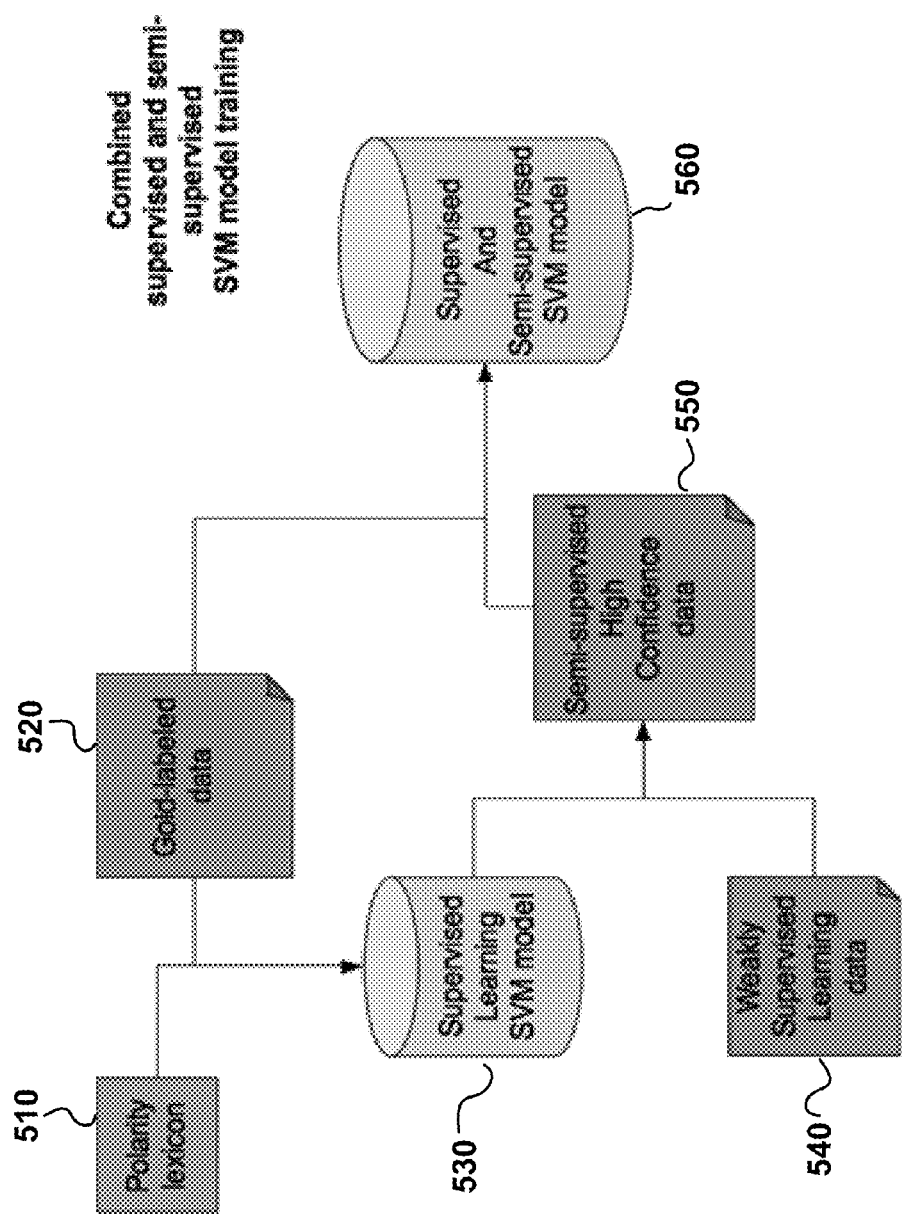
FIG. 5 is a detailed flowchart of computer processor steps followed during the Lexical Analysis step of the SAFE module.
Figure 6:
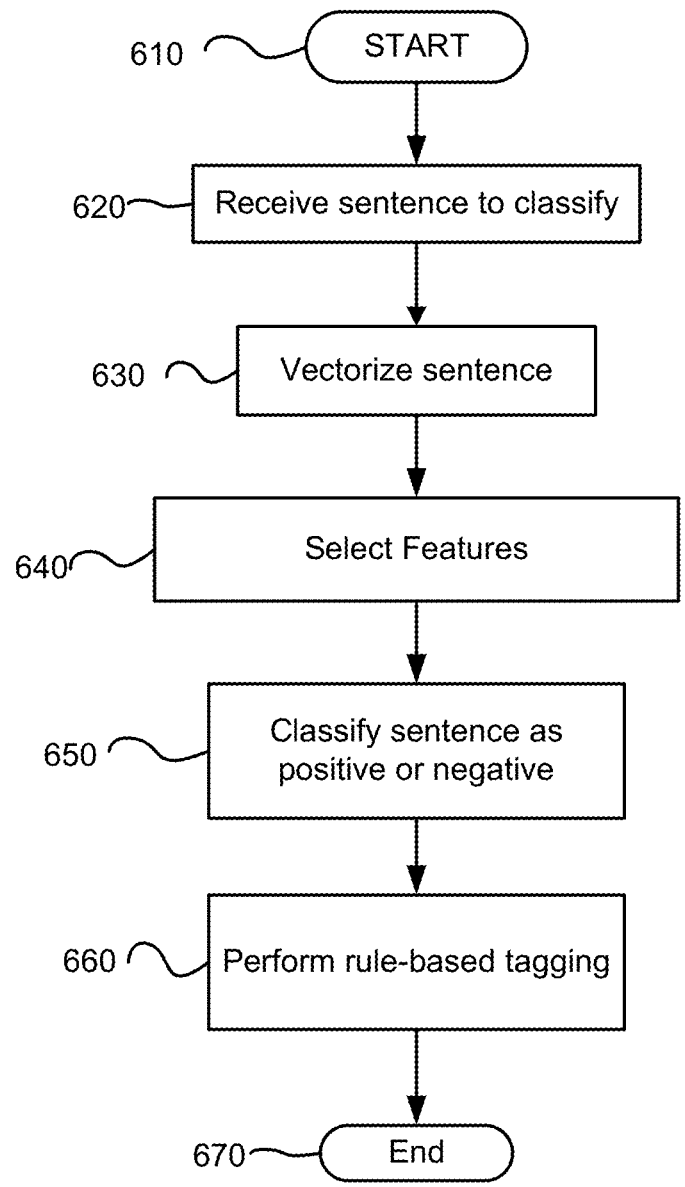
FIG. 6 is a detailed flowchart of computer processor steps followed during the Supervised Machine Learning Analysis step of the SAFE module.
Figure 7:
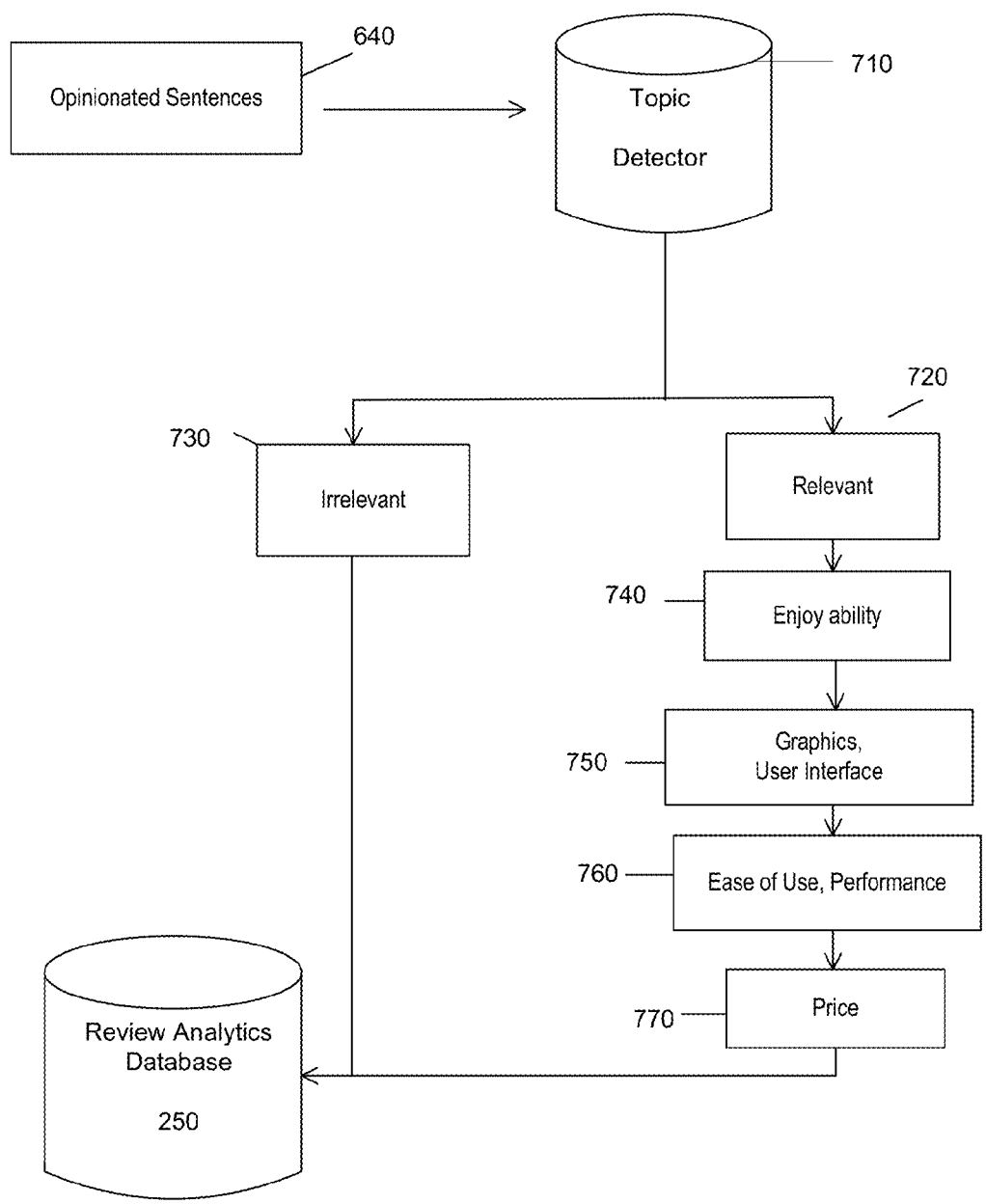
FIG. 7 is a detailed flowchart of the computer processor steps followed during the Machine Learning Topic Detection.

Previously, an opinion mining model was developed (the operation of which will be described in conjunction with FIGS. 5 and 6). To generate the opinion mining model, initially, the system collected about 500,000 product reviews. The review data was split into sentences and exploited in two sub-sets; (1) Gold-Labeled Data, and (2) Noisy-Labeled Data. For the gold-labeled data, a total of 8,000 sentences were randomly sampled from the 500,000 product reviews for gold/human annotation. The annotation was performed by a single individual, a native speaker of English with a Ph.D. in linguistics. The annotation was performed in two stages, first sentiment purity was detected, and second subjectivity was identified. Sentiment purity is a concept used to decide whether a sentence has a single sentiment type (i.e., positive or negative sentiment) or multiple sentiment types (i.e., both positive and negative). For sentiment purity, a tag from the set {MIXED, NON-MIXED} was assigned to each sentence. For this stage, of the 8,000 sentences, 82 cases were labeled MIXED and 7,918 cases were labeled NON-MIXED. Next, subjectivity refers to whether a sentence is objective (or neutral) or bears sentiment. For this stage, the annotator was asked to assign sentences that were judged as NON-MIXED from the previous stage of sentiment purity one tag from the set {Pos=positive, Neg=negative, NEUT=neutral/objective}. Out of the 7,918 NON-MIXED cases, a total of 4,098 sentences were assigned a Pos tag, 3,340 were assigned a Neg tag, and 562 sentences were assigned a NEUT tag. The gold labeled data 520 is shown in FIG. 5.

For the noisy-labeled data, 100,000 sentences were randomly extracted from reviews where users rate a product with 5 stars, and the same number of sentences (i.e., 100,000 sentences) was randomly extracted from reviews where users rate a product with 1 star. The sentiment expressed in each sentence is approximated as a function of the assigned star rating such that sentences assigned a single star are considered negative and those assigned five stars are considered positive. This type of self-labeled data (540 in FIG. 5) is used in weakly supervised learning.

Developing a Sentiment Lexicon

Next, a sentiment lexicon (510 in FIG. 5) was developed to enhance the classification. This process involved pointwise mutual information (PMI). PMI is a statistical measure of the co-occurrence of two events that captures the discrepancy between the probability of their coincidence given their joint distribution and their individual distributions. The PMI between a word "w" and its class "c" (i.e., the Pos vs. the Neg class in our current case) is:

$$PMI(w, c) = \log_2 \frac{P(w, c)}{P(w) \, P(c)}$$

PMI was used with the noisy-labeled data for the lexicon extraction. For each of the Pos and Neg cases, a word occurring with a frequency threshold of 10, 15, 20, and 50 or more in any of these two classes, was added to the sentiment dictionary and assigned the class label of the category it is derived from. For example, if the word "fast" occurs with the respective threshold in the Pos sentences dataset, the word is added to a Pos sentiment lexicon dictionary. Similarly, if the word "crash" occurs in the Neg sentences with the respective threshold, it is appended to the Neg dictionary.

When the threshold was set at 20, the developed lexicon had 5,845 Pos words and 5,862 Neg words (for a total of 11,635 words). Table 1 provides non-limiting examples for the words assigned a Pos tag by the PMI metric, and Table 2 provides non-limiting examples assigned a Neg table by the same metric:

TABLE 1

| PMI-Pos examples | | | |
|---|---|---|---|
| replayable | extraordinary | awsomeness | viciante |
| encanto | appeasy | mesmerizing | i?this |
| chalenging | beasty | nyannyannyannyan | fun(: |
| adorei | iove | addictively | goooooood |
| summonx3 | sin?player | $500 | appvery |
| defence | 50% | game:d | lotta |
| luvs | witty | adventurous | awsomest |
| diggity | pastime | gamegreat | hillarious |
| additing | applove | awaome | exellent |
| regrets | applecare | owain | cheers |
| caveman | adicted | $25 | funest |
| fascinating | rocks? | gamelove | addictingly |
| unwind | provoking | loveit | loooooove |
| engrossing | :)? | | chido |

TABLE 2

| PMI-Neg examples | | | |
|---|---|---|---|
| worthless | stinks | advertisement | stink |
| worst | unreliable | wtf? | buggy |
| unusable | scam | lousy | advertisements |
| horrid | disappointing | clicked | greedy |
| hangs | point? | froze | activation |
| unplayable | misleading | crashes | deleting |
| fraud | unstable | uninstall | ruin |
| refund | refuses | uninstalled | exits |
| happened? | startup | sirve | login |
| invalid | suks | sluggish | crappy |
| horrible | shuts | outdated | unavailable |
| inaccurate | false | incomplete | screen? |
| downgrade | summonx3 | attempted | deletes |
| useless | unresponsive | sucky | refuse |
| ruined | worse | blank | crash |
| awful | retarted | quits | crashing? |
| garbage | >:( | zero | cheated |
| terrible | disappointment | really? | failure |
| stupidest | bogus | freezes | ads? |
| seriously? | shutting | supposedly | open |

TABLE 2-continued

| PMI-Neg examples | | | |
|---|---|---|---|
| suckish | dumbest | poor | frozen |
| rubbish | incorrect | screwed | freeze |

Next, the opinion mining model was built using a hybrid approach combining both machine learning and rule-based methods. The machine learning methods are used to tease apart the Pos from the Neg sentences, whereas the rule-based method is used for two purposes: 1) to identify OBJ cases and 2) to assign intensity to the identified Pos and Neg sentences such that a sentence that is already assigned a certain sentiment category is further considered for an extra intensity VERY-Pos or VERY-Neg tag. For the machine learning methods, Support Vector Machines (SVMs), a class of machine learning models with associated algorithms, are chosen for building the opinion mining models with a combination of three different machine learning paradigms. The three machine learning paradigms are introduced below. The rule-based approach is described later in the context of the development procedure below.

Three types of learning paradigms are combined to build the opinion mining model (automatic sentiment detector). Each of these is introduced below.

The first is supervised learning (shown as block 530 in FIG. 5). Supervised learning is the machine learning task of inferring a function from human-labeled training data. For this component of the model building process, the gold-labeled data 510 described above is used. The second learning paradigm is Semi-supervised learning, which is the machine learning task of inferring a function from a combination of a small amount of human-labeled training data and a larger amount of unlabeled data. From the different semi-supervised approaches, self-training is adopted in building the opinion mining models. Self-training works such that a small amount of data is used to train a supervised classifier that is used for predicting a huge collection of unlabeled data. The examples from unlabeled data that are predicted with highest confidence (i.e., based on a certain threshold) are then added to the training data and the process is repeated iteratively until no classification improvement is acquired. In developing the opinion mining models, two departures were made from the traditional semi-supervised learning paradigm, as follows:

1. We start off by training the supervised model on a big-sized training set. This is possible as we were able to human-label a total of 8,000 sentences of which 7,438 carry either Pos or Neg sentiment. This step ensures our self-training models are robust.
2. Instead of augmenting the TRAIN set with agnostic data that carry no sentiment clues, we choose to enhance the TRAIN data with aggressively filtered weakly-supervised data (shown as 540 in FIG. 5) that are likely to belong to one of the two Pos and Neg classes.

The third and final learning paradigm is Weakly-supervised learning, which is a machine learning paradigm where a function is inferred from training data with partial information about class membership. In the case of opinion mining, the data used for this task are assigned star ratings by app reviewers. A sentence that belongs to a review rated with five stars is considered Pos and one labeled with a single star is considered Neg. All reviews assigned two, three, and four stars are ignored since the goal is to select data representing the Pos and Neg classes as purely as possible. As is explained below, sentences with information (e.g., negation, softening items) that may signify deviation from a review's assigned star rating are further filtered out.

Experiments were performed with the different machine learning paradigms combined with a number of heuristics and rules. With each learning method, a specific data set was exploited. What follows is a description of the different ways the data was split and the different learning paradigms. For all experiments, results were reported using the standard evaluation metrics of accuracy (Acc), precision (Prec), recall (Rec), and F-measure (F). Performance is evaluated on each sentiment class (i.e., Pos and Neg) independently as well as averaged across the two classes combined. The experiments used a linear SVM classifier (≤http://scikit-learn.org/stable/modules/generated/sklearn.svm.LinearSVC.html≥) as implemented in sickitlearn (≤http://scikit-learn.org/stable≥), the disclosure of which is incorporated by reference in its entirety.

The opinion mining model was developed exploiting both the gold-labeled data and noisy-labeled data. For the gold-labeled data, the 7,438 Pos and Neg gold cases were split in a standard fashion for the supervised learning SVM model 530: 80% TRAIN (i.e., 5,950 cases), 10% DEV (i.e., 744 cases), and 10% TEST (i.e., 744 cases). We use TRAIN to train the classifier, DEV to tune the classifier parameters, and TEST as a blind test set to report classifier performance. For noisy-labeled data, the 200,000 Pos and Neg noisy-labeled data were further filtered by applying a noise reduction filtering process as follows: All sentences with negation (i.e., where negation markers like "not" and "never" occur) are filtered out, since negation can change the sentiment expressed in a sentence. Since disjunctive conjunctions (i.e., items like "however" and "but" that are used to relate two opposing propositions in a sentence) play a role similar to that of negation with regard to reversing a sentence's polarity, sentences including these are also removed. In addition, since it is our belief that sentences with strong, not softened, sentiment are better for training sentiment classifiers, sentences with hedges/softeners (i.e., items that soften claims like "probably" and "perhaps") were also excluded from the collection.

The data was then used to train the opinion mining model using each of the learning paradigms. For Supervised Learning, the gold-labeled data was used to train the Supervised learning SVM model 530 with a rich feature set. The model is typically trained on the 80% gold-labeled TRAIN, tuned on the 10% gold-labeled DEV and tested on the 10% gold-labeled TEST as these are described above. The feature set for this iteration of experiments can be categorized into three main types, as follows: Bag-of-words, linguistically motivated features, and lexicon-based features.

Linguistically motivated features include the following features: 1) hasEmoticon, a binary feature for existence or lack thereof of one or more emoticon (e.g., a smilie face "☺") in a sentence; 2) hasSoftener, a binary feature for existence or lack thereof of one or more softener/hedging device (e.g., "may," "perhaps") in a sentence; hasBoosters, a binary feature for existence or lack thereof of one or more boosting device (e.g., "really," "definitely") in a sentence; hasNegation, a binary feature for existence or lack thereof of one or more negation device (e.g., "not," "never") in a sentence; and hasContrastives, a binary feature for existence or lack thereof of one or more disjunctive conjunction (e.g., "however" and "but") in a sentence.

Lexicon-based features are a group of binary features for existence or lack thereof of one or more lexical items from developed dictionaries. These features are below:

1. hasAppLexFeatSelectPos: (fires if one word from a total of 190 Pos words, extracted using PMI with a threshold of 50, occur in a sentence)
2. hasAppLexFeatSelectNeg: (fires if one word from a total of 287 Neg words, extracted using PMI with a threshold of 50, occur in a sentence)
3. hasAppLexFeatSelectNegThresh: (fires if one word from a total of 484 Neg, extracted using PMI with a threshold of 25, words occur in a sentence)
4. hasAppLexPos: (fires if one word from a total of 613 Pos, extracted using PMI with a threshold of 20, word occur in a sentence)
5. hasAppLexNeg: (fires if one word from a total of 1347 Neg, extracted using PMI with a threshold of 20, words occur in a sentence)

Next, the data was used to further train the opinion mining model using the remaining two learning paradigms: Combined Semi-Supervised Learning and Weakly Supervised Learning. As explained earlier, multiple filters are employed to ensure the weakly supervised data set does not include sentences with mixed sentiment, nor weak polarity. Of importance here is the filter achieved in a semi-supervised fashion (namely via employing self-training). This step is done by running the SVM supervised classifier exploiting the gold-labeled data as explained in the section above and filtering out all sentences predicted with weak confidence. Weak confidence is defined as a score <−0.5 for the Neg class and >0.5 for the Pos class. Using this supervised model, a total of 94,848 sentences (constituting 56,514 Neg cases and 38,334 Pos cases) were identified. This set of sentences is thus acquired via combining the supervised and the semi-supervised paradigms on weakly supervised data.

The total of 94,848 noisy-labeled sentences acquired from the current step is then used to augment the gold-labeled TRAIN set from gold-labeled data as described earlier. The final TRAIN dataset is thus at 102,286 sentences, with a total of 60,612 Neg cases and 41,674 Pos cases. Since 400 sentences for testing is a small size, given the ambitious models we seek to build, a decision was made to also augment the 400-sentence TEST set described above by adding 20,000 sentences sampled from the app review collection we crawled. The 20,000 TEST sentences are broken down to 10,000 with a star rating of 5 and hence considered Pos and 10,000 with a star rating of 1 and hence considered Neg. The final TEST thus comprises 20,400 sentences, and the DEV is as is at 400 sentences.

The augmented TRAIN set of 102,286 sentences described above is used for the next iteration of experiments, after performing feature selection based on information gain (IG) where all features not associated with a given class (i.e., a Pos or a Neg class in the current case) with a certain distribution based on a given threshold are filtered out. Different thresholds were tried with IG-based feature selection and the value of 0.70 was found to achieve best model performance. With this value, the feature space is reduced from 96,678 features to 44,883 features (i.e., a reduction of 46.43%).

As previously stated, the supervised and semi-supervised SVM model 560 was developed above to distinguish Pos from the Neg sentences. A separate rule-based method is used for two purposes: 1) to identify OBJ cases and 2) to assign intensity to the identified Pos and Neg sentences such that a sentence that is already assigned a certain sentiment category is further considered for an extra intensity VERY-Pos or VERY-Neg tag.

In order to detect OBJ classes (i.e., where no sentiment is expressed) and the intensity of sentiment in polarized sen- that specific feature is not among ones that are selected based on information gain as explained earlier.

TABLE 3

Example Sentence Processing

| Sentence | Pre-processing (lowercasing and lemmatization) | Part of speech (POS) tagging | Vectorization | Select features |
|---|---|---|---|---|
| The atmosphere it creates is ideal for any boardwalk or carnival lover! | the atmosphere it create be ideal for any boardwalk or carnival lover ! | the/DT atmosphere/NN it/PRP create/VBZ be/VBZ ideal/NN for/IN any/DT boardwalk/NN or/CC carnival/NN lover/NN !/Fat | 969:1.0 1387:1.0 1389:1.0 1567:1.0 2277:1.0 2404:1.0 2421:1.0 2954:1.0 3390:1.0 3780:1.0 5066:1.0 5152:1.0 5735:1.0 | 969:1.0 1387:1.0 1389:1.0 1567:1.0 2277:1.0 2404:1.0 2421:1.0 2954:1.0 3390:1.0 5066:1.0 5152:1.0 5735:1.0 | tences, a rule-based classifier is built. The rule-based classifier depends on a combination of confidence scores from the sentiment classifier 560 and a number of carefully designed features. The rule-based classifier works on the output of the sentiment classifier 560 where three types of information are available: (1) A sentiment tag from the set {Pos, Neg}; (2) A confidence score accompanying the sentiment tag from 1 above; and (3) Feature annotations at the returned vector level. The feature annotations indicate whether or not a certain feature exists in a sentence. A listing of these features are also used with the machine learning classifier as explained earlier, but repeated here for convenience:

hasAppLexFeatSelectPos
hasAppLexPos-ANDNOT-hasAppLexNeg
hasAppLexPosTwo-ANDNOT-hasAppLexNegTwo
hasModality
hasNegation
hasContrastives The combined machine-learning and rule-based assignment method will now be described in connection with FIG. 6, beginning at step 610. At step 620, the opinion model receives new data to classify. This data will be the sentences that were ouputted from step 450 (in FIG. 4). The sentence will have already been pre-processed (lowercasing and lemmatization) and tagged for parts of speech. Table 3 shows an example sentence: "The atmosphere it creates is ideal for any boardwalk or carnival lover!" The results of the pre-processing and POS steps (from step 450 in FIG. 4) are shown.

Next, each sentence will be vectorized (step 630). Column 4 in Table 3 has an example "vector" where each word in the sentence is represented as a feature represented in numeric form. For example, the word "the" is the feature with index "969". The feature is written as "969:1.0" where the ":1.0" is a formatting convention that indicates that this is a feature in the sentence. Next, the features of the vectorized sentence will be selected (step 640). The last column has only select features from the vector. Whereas column 4 has 13 features, column 5 (i.e., the last column, has only 12 features, after kicking out the last feature from the vector. A close observation of the vector in the last column will show that the feature "3780:1.0" (which stands for the word "or") does not exist in the vector of select features. This is the case since In step 650, the sentences are run through the supervised and semi-supervised SVM model 560 for sentiment classification. The sentences returned from step 650 carry the predicted sentiment tag (i.e., either Pos or Neg or OBJ). At step 660, for each sentence assigned a sentiment tag (either Pos or Neg), potentially another tag from the set {VERY-POS, VERY-NEG} may be assigned to the sentence based on the three types of information listed above (the sentiment tag (Pos or Neg), a confidence score accompanying the sentiment tag from step 650, and the feature annotations returned from steps 630 and 640). The tag assignment in step 660 is a function that takes as input the triple information tuple above as well as the vector of the sentence and returns the predicted tag, the same confidence score that was received in the input and the same vector that was received in the input. The confidence score and the vector are returned for later processing in the overall system pipeline. The confidence score may indicate the confidence of the predicted sentiment tag (Pos or Neg). To distinguish it from other types of vectors, the vector returned from the sentiment module is interchangeably referred to as the "sentiment vector" or the "polarity vector" later in this document.

Topic Analysis

Following Supervised Machine Learning subroutine 470, the SAFE module performs the "Topic Analysis" subroutine (FIG. 4A, step 480). During Topic Analysis each sentence identified as negative, positive, very negative, or very positive in Supervised Machine Learning (steps 650 and 660 in FIG. 6) is further analyzed by a set of Support Vector Machine classifiers to determine the topics that it mentions. Exemplified topics were defined as a hierarchy as follows:

Irrelevant
Relevant
  Enjoy ability
  Graphics/UI
  Ease of use/Performance
  Price Each sentence identified as negative, positive, very-negative, or very-positive is matched against a set of precompiled lists of lexical features and transformed into a series of vectors for each of the SVM classifiers to process them. The precompiled lists of lexical features were created during the training stage by analyzing and comparing the set of words that tend to occur more prominently for each of the topic categories. Classifiers were trained using a manually labeled set of sentences to make the following distinctions:

Irrelevant vs. Relevant
Enjoy ability vs. Non-enjoy ability
Graphics/UI vs. Non-Graphics/UI
Ease of use/Performance vs. Non-Ease of use/Performance
Price vs. Non-Price With this set of classifiers, sentences get classified as being "Relevant" or "Irrelevant". If they get classified as "Relevant", then they get classified as mentioning any of the topics listed under "Relevant" in the hierarchy supra (i.e. Enjoy ability, Graphics/UI, Ease of use/Performance, and Price).

Finally, every sentence is classified as carrying polarity and classified with one or more of the categories under "Relevant", and is stored along with its unique application ID (AppID), a polarity value, topic value(s), polarity vector and topic vector(s) in the Review Analytics Database. A sentence that has been tagged as POS may be given a polarity value of "1". A sentence that has been tagged as NEG may be given a polarity value of "−1". A sentence that has been tagged as VERY-POS may be given a polarity value of "2". A sentence that has been tagged as VERY-NEG may be given a polarity value of "−2". A sentence that has been tagged as OBJ may be given a polarity value of "0".

Statement Matcher

The Statement Matcher (see FIG. 4A, 495) refers to the process of: 1) finding one or more Canonical Statements within a Product's review dataset that contain comments, observations, or sentiments statistically likely to be shared by multiple reviews in the dataset (FIG. 4B, 497), and, 2) determining the subset of reviews that made statistically similar statements to these Canonical Statements (FIG. 4B, 499). Example output of the Statement Matcher could be embodied as follows:

Canonical Statement 1: "Great graphics!"
24 reviews were found to have made similar statements.
Canonical Statement 2: "My kids loved it"
13 reviews were found to have made similar statements.

1—Finding Canonical Statements

Figure 8A:
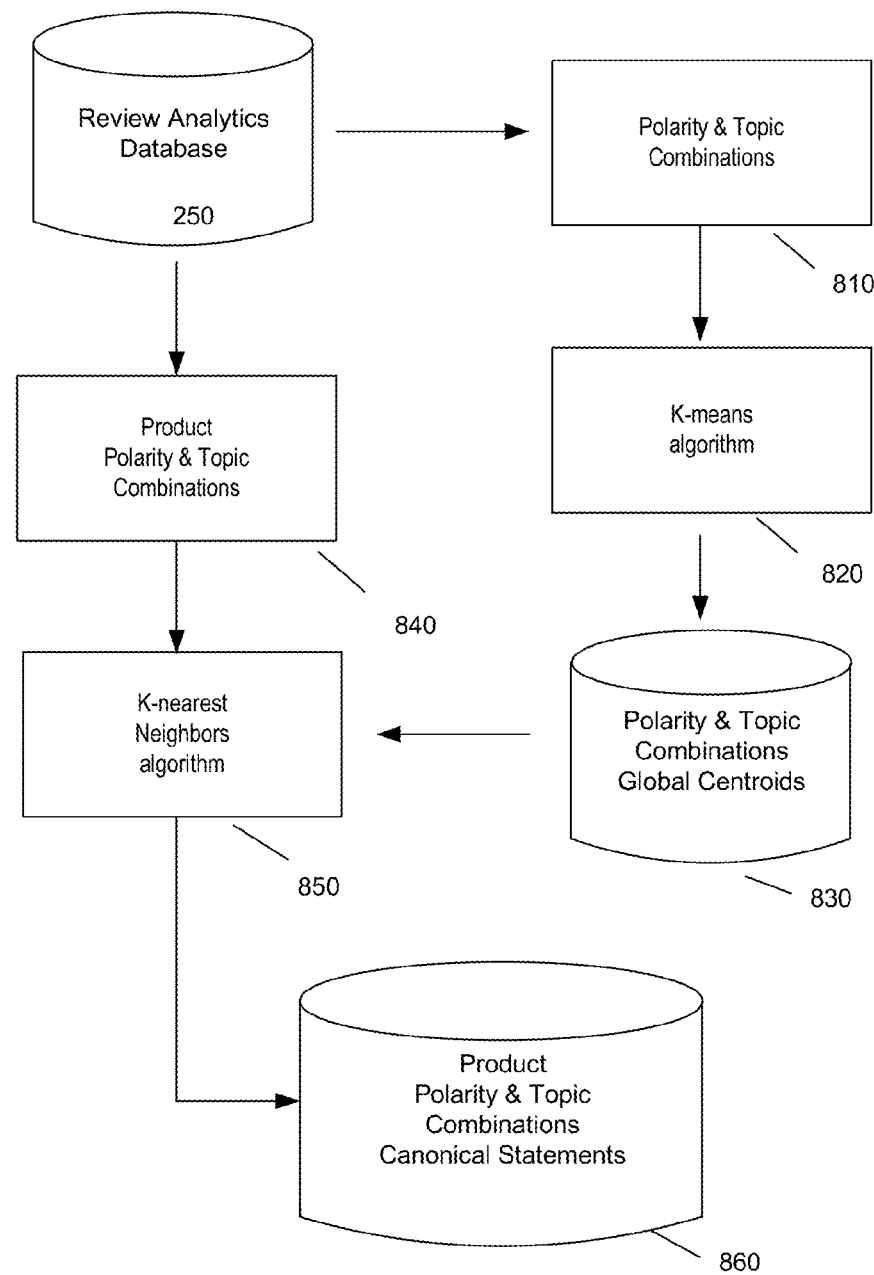
FIG. 8A is a flowchart of the computer processor steps followed during the Statement Matcher Analysis for finding canonical statements.

The Statement Matcher has two stages for finding Canonical Statements, as illustrated in the flowchart of FIG. 8A. First it finds the global centroid—the centroid for all Product Reviews of a specific Product Category—for each valid combination of Topic and Polarity (ex. Topic=Enjoy ability, Polarity=Positive). The centroid is calculated mathematically using the concatenation of the Polarity Vectors and Topic Vectors calculated during the Topic and Polarity Analyses described above.

The Statement Matcher identifies all Statements classified with the same Topic/Polarity combination (step 810) and runs the k-means algorithm (step 820) to find the centroid of the vector space defined by that subset.

Second, once global centroids (step 830) have been found, the Statement Matcher iterates over the Product List and identifies all the statements associated with each Product for every valid combination of topic and polarity (step 840). The concatenated Polarity and Topic vectors of the identified statements are analyzed using the k-nearest neighbors algorithm (step 850) to find the Statement that is closest to the global centroid found in the previous stage (step 860).

Exemplification:

1. The global centroid for Product='ABC Widgets', Topic=Enjoy ability and Polarity=Very Positive is identified.
2. All the Statements for Product='ABC Widgets', that have been tagged as Topic=Enjoy ability, Polarity=Very Positive are identified.
3. Apply the k-nearest neighbors algorithm to all Statements identified in the previous step to determine which one of those Statements is the closest to the global centroid.
4. The Statement identified in previous step is tagged as the Canonical Statement for that Product/Topic/Polarity combination.

2—Finding Similar Statements

Figure 8B:
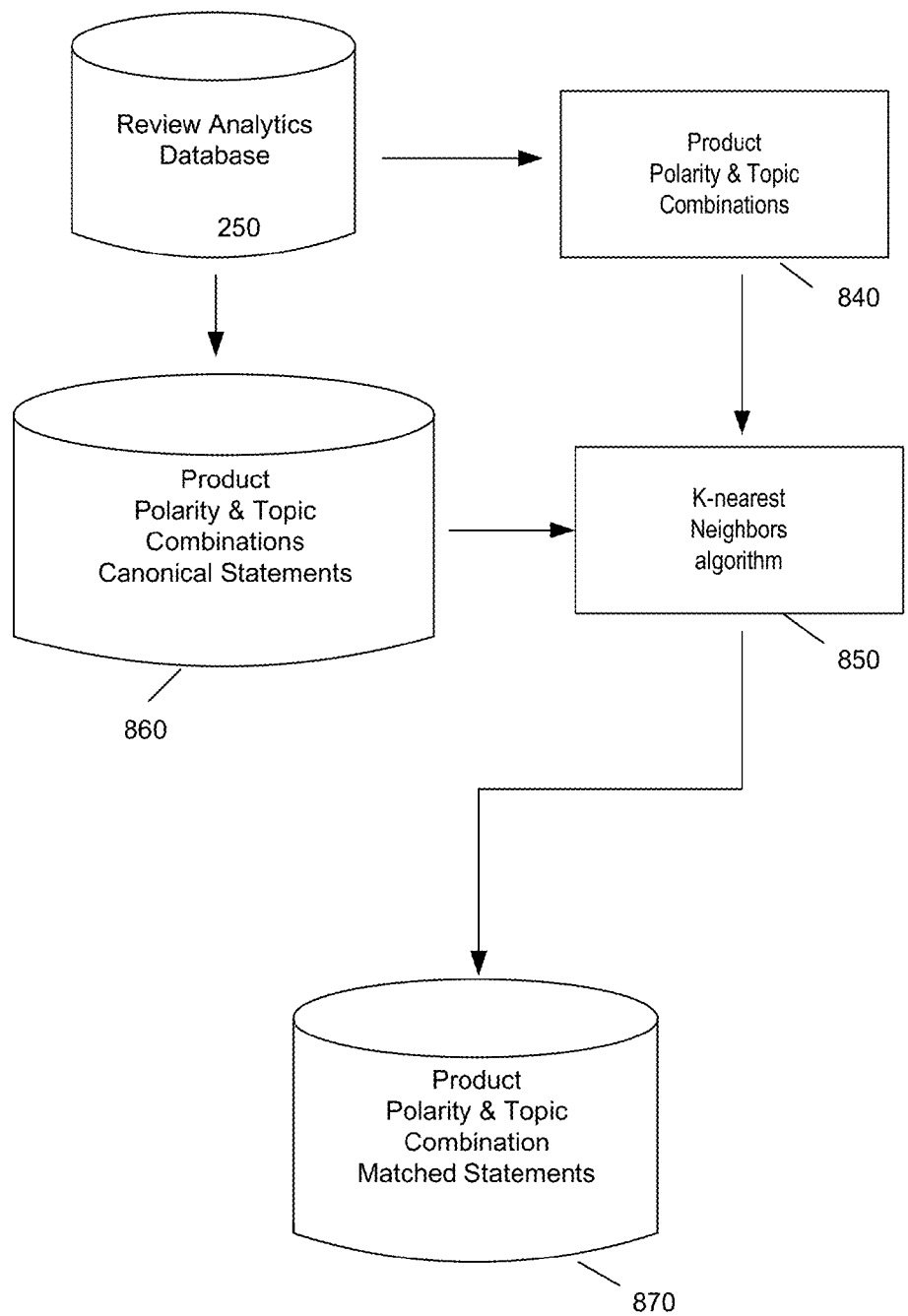
FIG. 8B is a flowchart of the computer processor steps followed during the Statement Matcher Analysis for finding similar statements.

The flowchart in FIG. 8B discloses the computer steps for determining the subset of reviews that made statements similar to the Canonical Statement. For each Product, the Statement Matcher algorithm re-runs the k-nearest neighbors algorithm (FIG. 8A, step 840 & 850), but in this case the reference Statement used is the previously determined Canonical Statement (FIG. 8A, step 860). The vector space defined by the concatenated Polarity and Topic vectors of each valid combination of topic and polarity gets analyzed using as reference the Canonical Statement to find which Statements are the most statistically similar.

The most statistically similar statements matched on the previous step are subsequently filtered using a fuzzy matching algorithm that compares their tokenized sentences to the Canonical Statement's tokenized sentence and selects only those statements that have a fuzzy matching score above a predefined threshold, that is which are superficially most similar to the Canonical Statement (step 870).

Query Interface Web-Based Application

From the user client computing device 270 in FIG. 2B, the user may search for and view the SAFE processed reviews by navigating via the Internet to a web-hosted site displaying the Query Interface Web Application 800. It is also noted that the user may interact with the Query Interface Web Application by utilizing the computer product of the present invention installed as an App on their mobile electronic computing device.

The Query Interface Web Application 800 enables the user to search for products based on its commercial name or category of use or tangible item (i.e. Games, Productivity tools, Cameras, etc.). Upon the user entering a search for a particular product or a category of products, the Query Interface Web Application will retrieve any pertinent information stored on the system server's Review Analytic Database 250 in FIG. 2B and display it on the user's GUI. The display may comprise a variety of formats to disclose the users' reviews extracted from various data sources and processed by the SAFE module. In a preferred embodiment, the user's display may comprise the following features for a search, summary, and a detailed page of analytics for each Product:

1) Request Search Page:
   a) Search text entry field; and,
   b) A list of links to categories and/or pre-canned search filters (e.g. "What's Trending", "All-time Greats", "On Sale", etc.);
2) Search Summary Page:
   a) Search text entry field at top with drop down select lists for iPhone/iPad, Free/Paid, and Category lists;
   b) Search results displayed in 3×3 grids with numbered links to other pages of results; and,
   c) Each Product in result group with its Name, Price, Icon, 0-5 star rating, count of ratings, screen shot, link to iTunes® and link to "Info & Reviews" (see infra).

3) "Info and Reviews" Page:
   a) Search field at top;
   b) Product information row below (i) comprising Product's Icon, Name, Screen Shots, link to online store (e.g. iTunes, Amazon);
   c) Collate feature comprising: a list of 3 pull quotes culled from user reviews along with a sentence like, "[x] users out of [y] made a similar statement." Each quote has link to the Review Detail Page;
   d) A list of features extracted from reviews with average score next to them (e.g. 80% positive, Easy to Use 60% positive, Fun factor 40% positive);
   e) The most positive/negative reviews: list of 2 pull quotes culled from users that system determines are most positive/negative (e.g. "Most positive review: 'review content'", "'Most negative review: 'review content'"); and,
   f) A link to review feed, with some choices for how to order the results by, for example, the most recent/oldest date posted, by highest/lowest Easy, highest/lowest Easy to Use, highest/lowest Fun Factor, etc.
4) A Review Detail Page (shown when user clicks on reviews from either the collate feature, most positive/negative quotes, or the Review Listing):
   a) Score for each feature extracted. For example, a very positive review may have: Positive; Ease of Use: Positive; Fun Factor: Negative.
   b) Short cross-reference list of other Products (with name/icon) that same reviewer gave a very positive review for extracted features (i.e. list contains reviews with ratings: Positive and/or Easy to Use: Positive and/or Fun Factor: Positive). Clicking on one of these brings up the Review Detail Page for this other Product.
5) Pro Reviews Page (shown when user clicks on review from either a collate feature, most positive/negative quote, or the Review Listing):
   a) Listing of reviews extracted by Review Scraper from 'professional' data sources other than Product store repository (e.g. Apple review repository);
   b) Displays name of data source (blog, online magazine, website, etc.) with clickable link to the original review; and,
   c) Display review text.
6) A "Product Review Cross-Referencing Positive" feature comprising a list of other products that a reviewer who gave a high rating for the product of interest by the user, also gave a high rating to. If any product on the list is in the same category as the type of product the user is searching for, then the user is able to compare the features between the products and possibly find another product with similar desirable features, at perhaps a better price and/or possessing additional, desirable features. This is accomplished by querying the Review Analytics Database for all highly rated products reviewed by the same reviewers that gave the product of interest a high rating. The result set from this query contains all analytics results for each highly rated product, respectively, as required for display in the web application.
7) A "Product Review Cross-Referencing Negative" feature comprising a list of other products that a reviewer gave a positive rating for, while giving a negative rating to the product of interest by the user. By comparing the two, the user may be able to identify another product with improved performance and/or features as compared to the product that they were originally researching on the system. This is accomplished by querying the Review Analytics Database for all highly rated products reviewed by the same reviewers that gave the product of interest a low rating. The result set from this query contains all analytics results for each highly rated product, respectively, as required for display in the web application.

It is noted that the outline supra is only one exemplification of the present invention's Query Interface Web Application's functionality. One of ordinary skill in the art would readily know of other ways to utilize the system of the present invention to prompt the user for search terms, then extract and present the SAFE processed information from the Review Analytics Database, as well as to perform other types of data analysis on multiple reviewers' summaries stored in the Review Database.

CONCLUSION

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowcharts and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "preferred embodiment", "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", and grammatical variants thereof do not preclude the addition of one or more components, features, steps, or integers or groups thereof and that the terms are to be construed as specifying components, features, steps or integers.

What is claimed is:

1. A computer-implemented method comprising:
   electronically retrieving product reviews for a product from at least one online data source, each product review comprising at least one statement;
   storing the product reviews in an electronic database;
   identifying a plurality of product features of the product;
   storing the plurality of product features in an electronic database;
   tagging each word in each statement with a part of speech tag and with a polarity value, wherein the tagging each word with a part of speech tag comprises:
     performing tokenization to break the statement into words or tokens;
     determining the lemma for each word or token to produce tokenized text and determining a part of speech for each lemma; and
     assembling the tokenized text into a tokenized sentence; and
   wherein the tagging each word with a polarity value comprises:
     vectorizing each of the statement, wherein each word in each of the statements that are tagged with at least one specified value is represented as a feature in a numeric form;
   classifying each of the statements in the product reviews as positive, neutral, or negative based on the features in numeric form by determining the polarity value of each statement by comparing the words or tokens with a sentiment dictionary to determine whether a word is positive, negative or neutral;
   further classifying at least one of the positive statements as very positive and at least one of the negative statements as very negative based on the positive, neutral, or negative classification, a confidence score, and the statement features in numeric form by assigning an intensity to the polarity value by assessing modifiers in the tokenized sentence;
   analyzing the positive, very positive, negative, and very negative statements by a set of support vector machine classifiers to extract the product features in each sentence;
   calculating an average score for each of the product features based on the analysis of the positive, very positive, negative, and very negative statements; and
   transmitting to a user, the average scores for each product feature of the product.

2. The method of claim 1, wherein the features comprise: enjoyability, graphics, ease of use, and price.

3. The method of claim 1, wherein the products comprise at least one of services and consumer goods, and the product reviews evaluating the services and consumer goods are available on the Internet.

4. The method of claim 1, wherein the products comprise digital media purchased for online streaming, downloading, accessing via the Internet, and/or physically shipping to the user.

5. The method of claim 1, further comprising sending to the user, for the product of interest, a first quote from a most positive review and a second quote from a most negative review.

* * * * *